United States Patent
Hoster, Jr.

(10) Patent No.: US 7,247,027 B2
(45) Date of Patent: Jul. 24, 2007

(54) MASS CASUALTY, DISASTER TRAINING INFLATABLE MANIKIN

(76) Inventor: William Hoster, Jr., 2587 Willow Wick Ct., Sandy, UT (US) 84093

(*) Notice: Subject to any disclaimer, the term of this patent is extended or adjusted under 35 U.S.C. 154(b) by 536 days.

(21) Appl. No.: 10/889,300

(22) Filed: Jul. 12, 2004

(65) Prior Publication Data

US 2005/0100872 A1 May 12, 2005

Related U.S. Application Data

(60) Provisional application No. 60/518,195, filed on Nov. 7, 2003.

(51) Int. Cl.
*G09B 23/28* (2006.01)
(52) U.S. Cl. .................................... 434/262
(58) Field of Classification Search ................ 434/262, 434/265, 267, 268, 272, 219, 226
See application file for complete search history.

(56) References Cited

U.S. PATENT DOCUMENTS

| | | | |
|---|---|---|---|
| 2,752,697 A | 7/1956 | Lawall | |
| 3,027,655 A | 9/1962 | Alderson | |
| 3,295,235 A * | 1/1967 | Tauber | 40/1.5 |
| 3,740,871 A | 6/1973 | Berton et al. | |
| 3,858,351 A | 1/1975 | Porter | |
| 3,863,371 A * | 2/1975 | Shertenlieb | 40/124.2 |
| 3,983,649 A * | 10/1976 | Ellis et al. | 40/122 |
| 3,999,309 A * | 12/1976 | Gonzalez | 434/272 |
| 4,088,315 A * | 5/1978 | Schemmel | 482/4 |
| 4,439,162 A | 3/1984 | Blaine | |
| 4,575,126 A * | 3/1986 | Grubbs | 283/38 |
| 4,773,865 A | 9/1988 | Baldwin | |
| 5,018,977 A | 5/1991 | Wiley et al. | |
| 5,238,409 A | 8/1993 | Brault et al. | |
| 5,286,206 A * | 2/1994 | Epstein et al. | 434/265 |
| 5,369,899 A * | 12/1994 | Reeves | 40/1.5 |
| 5,411,437 A | 5/1995 | Weber et al. | |
| 5,423,685 A * | 6/1995 | Adamson et al. | 434/265 |
| 5,593,306 A | 1/1997 | Kohnke | |
| 5,823,787 A | 10/1998 | Gonzalez et al. | |
| 5,885,084 A | 3/1999 | Pastrick et al. | |
| 6,198,108 B1 * | 3/2001 | Schweitzer et al. | 250/472.1 |
| 6,305,605 B1 * | 10/2001 | Goetz et al. | 235/385 |
| 6,427,685 B1 | 8/2002 | Ray, II | |

(Continued)

OTHER PUBLICATIONS

Amir Vardi et al, "Simulation-Based Training of Medical Teams to Manage Chemical Warfare Casualties" IMAL vol. 4, Jul. 2002 pp. 540-544. [retrieved online Nov. 20, 2006].*

(Continued)

*Primary Examiner*—Kurt Fernstrom
(74) *Attorney, Agent, or Firm*—Thorpe North & Western, LLP

(57) ABSTRACT

A mass casualty disaster training system includes a plurality of manikins (mannequins) arrangeable to simulate a plurality of victims of a mass casualty disaster, and indicia associated with the plurality of manikins indicative of predetermined physical or medical conditions associated with the mass casualty disaster. A method for training for mass casualty disasters includes arranging a plurality of manikins to simulate a plurality of victims of a mass casualty disaster; and simulating triage and treatment of the plurality of manikins.

40 Claims, 4 Drawing Sheets

U.S. PATENT DOCUMENTS

| | | | |
|---|---|---|---|
| 6,438,853 B1 * | 8/2002 | Gordon et al. | 33/2 R |
| 6,530,783 B1 | 3/2003 | McGinnis | |
| 6,581,677 B2 * | 6/2003 | Dukes-Dobos et al. | 165/11.1 |
| 6,638,073 B1 | 10/2003 | Kazimirov et al. | |
| 6,651,367 B1 * | 11/2003 | Barragan | 40/610 |
| 6,783,829 B2 * | 8/2004 | Arena | 428/40.1 |
| 6,942,585 B1 * | 9/2005 | Krause | 473/445 |
| 7,044,531 B2 * | 5/2006 | Schaad | 296/97.5 |
| 2001/0012609 A1 * | 8/2001 | Pastrick et al. | 434/265 |
| 2003/0054904 A1 * | 3/2003 | Getchell | 473/446 |

OTHER PUBLICATIONS

Mario Trevino et al, "Response Be Nimble, Response be Quick", Fire Chief, Feb. 1, 2004. [retrieved online Nov. 20, 2006].*

Ben Matwey, "166th Medical Squadron Completes Expeditionary Medical Readiness Exercise in Michigan", DNG News, Aug. 2003. [retrieved online Nov. 20, 2006].*

D. Tanaka et al, "The Evaluation of the Color Blending Function for the Texture Generation from Photographs", 2001. [retrieved online Nov. 20, 2006].*

* cited by examiner

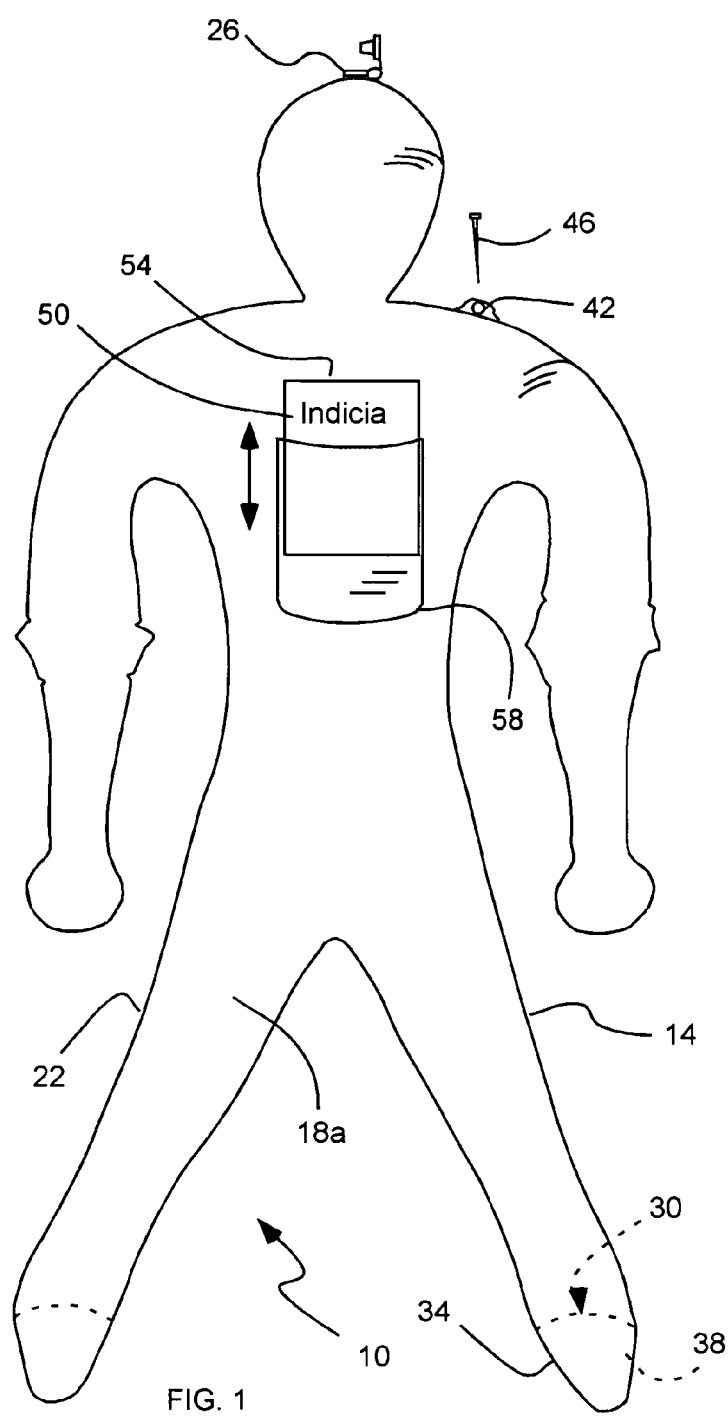
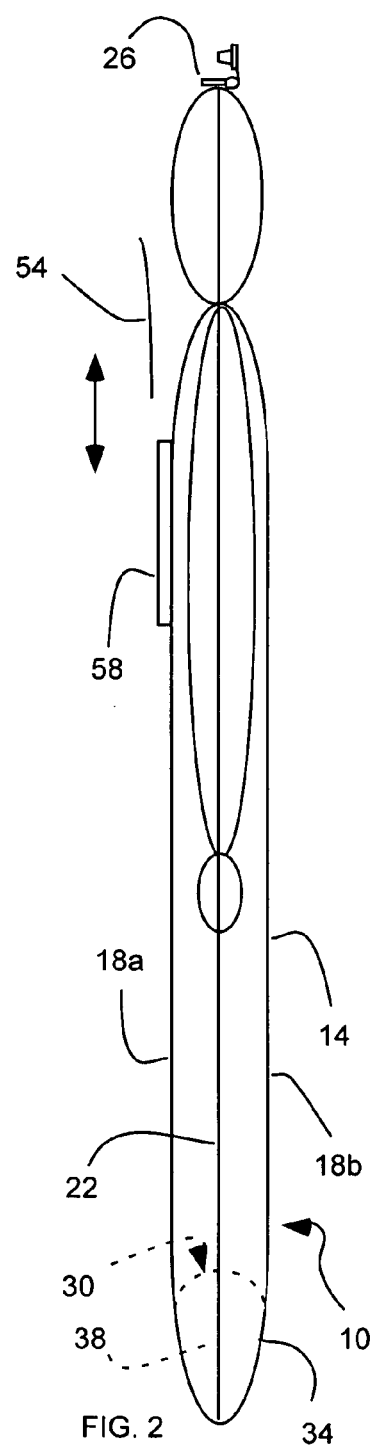
FIG. 1
FIG. 2

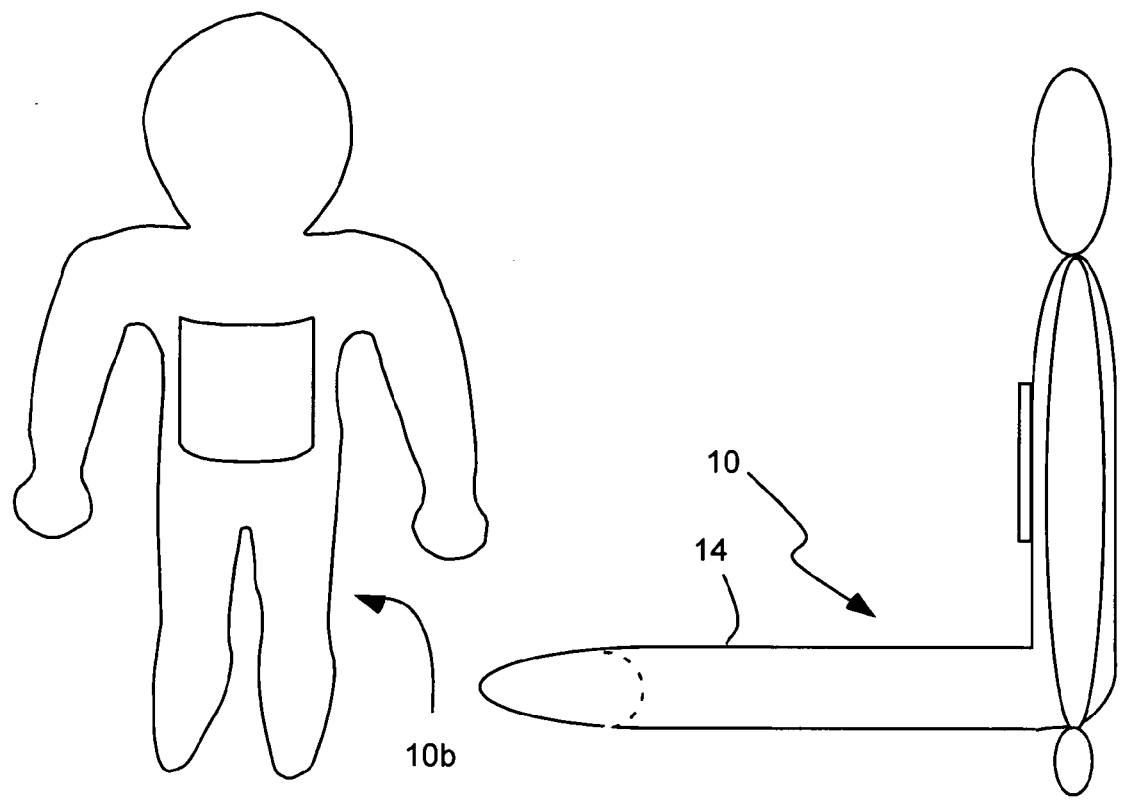
FIG. 5
FIG. 3
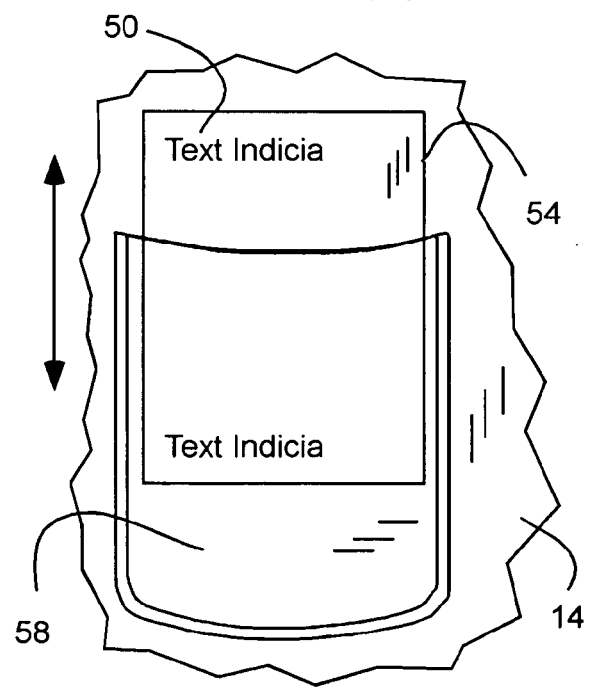
FIG. 4

MASS CASUALTY, DISASTER TRAINING INFLATABLE MANIKIN

Priority is claimed to U.S. Provisional Patent Application No. 60/518,195, filed Nov. 7, 2003.

BACKGROUND OF THE INVENTION

1. Field of the Invention

The present invention relates generally to mass casualty disaster training and inflatable manikins (mannequins). More particularly, the present invention relates to a system and method for using inflatable manikins for training for mass casualty disaster scenarios.

2. Related Art

Training for mass casualty disasters has become a standard for emergency agencies around the world. Such mass casualty disasters include various different scenarios, including for example, terrorist attack, transportation disaster (e.g. vehicle crash), natural disaster (e.g. earthquake), and the like.

Training for such mass casualty disasters typically involves numerous participants or actors who act as victims of the disaster. The participants or actors may act in accordance with an assigned condition or event, and may have make-up applied, to provide realism. It will be appreciated that the very nature of training for mass casualties requires numerous participants or actors. Organizing such disaster training can be costly, and can require enormous coordination efforts. For example, numerous participants or actors must be arranged for, organized, instructed, prepared, etc., in addition to the emergency agencies that will actually be training. The needs of the participants or actors must be considered, such as restroom facilities, food, water, etc.

SUMMARY OF THE INVENTION

It has been recognized that it would be advantageous to develop a system and method for mass casualty disaster training that requires fewer participants or actors. In addition, it has been recognized that it would be advantageous to develop a system and method for such training that is less costly and less complicated to implement and coordinate.

The invention provides a mass casualty disaster training system with a plurality of manikins (mannequins) arrangeable to simulate a plurality of victims of a mass casualty disaster. A plurality of indicia is each associated with one of the plurality of manikins that is indicative of predetermined physical or medical conditions associated with the mass casualty disaster.

In accordance with a more detailed aspect of the present invention, the plurality of manikins can be expandable and collapsible. For example, the manikins can be inflatable, and each can include an inflatable bladder with a human form.

In accordance with another more detailed aspect of the present invention, each of the plurality of manikins can include a pocket formed on the inflatable bladder. An insert can be receivable within the pocket, with the indicia disposed on the insert and visible from the pocket.

The invention also provides a method for training for mass casualty disasters. A plurality of manikins is arranged to simulate a plurality of victims of a mass casualty disaster. Triage and treatment of the plurality of manikins are simulated.

In accordance with a more detailed aspect of the present invention, a plurality of inflatable manikins can be inflated. Inflating the manikins can include inflating an inflatable bladder with a human form. The plurality of inflatable manikins can be deflated and stored after simulating triage and treatment.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 1 is a front view of a mass casualty disaster training manikin in accordance with an embodiment of the present invention;

FIG. 2 is side view of the manikin of FIG. 1;

FIG. 3 is a side view of the manikin of FIG. 1;

FIG. 4 is a partial front view of the manikin of FIG. 1;

FIG. 5 is a front view of another mass casualty disaster training manikin in accordance with an embodiment of the present invention;

DETAILED DESCRIPTION

Figure 6:
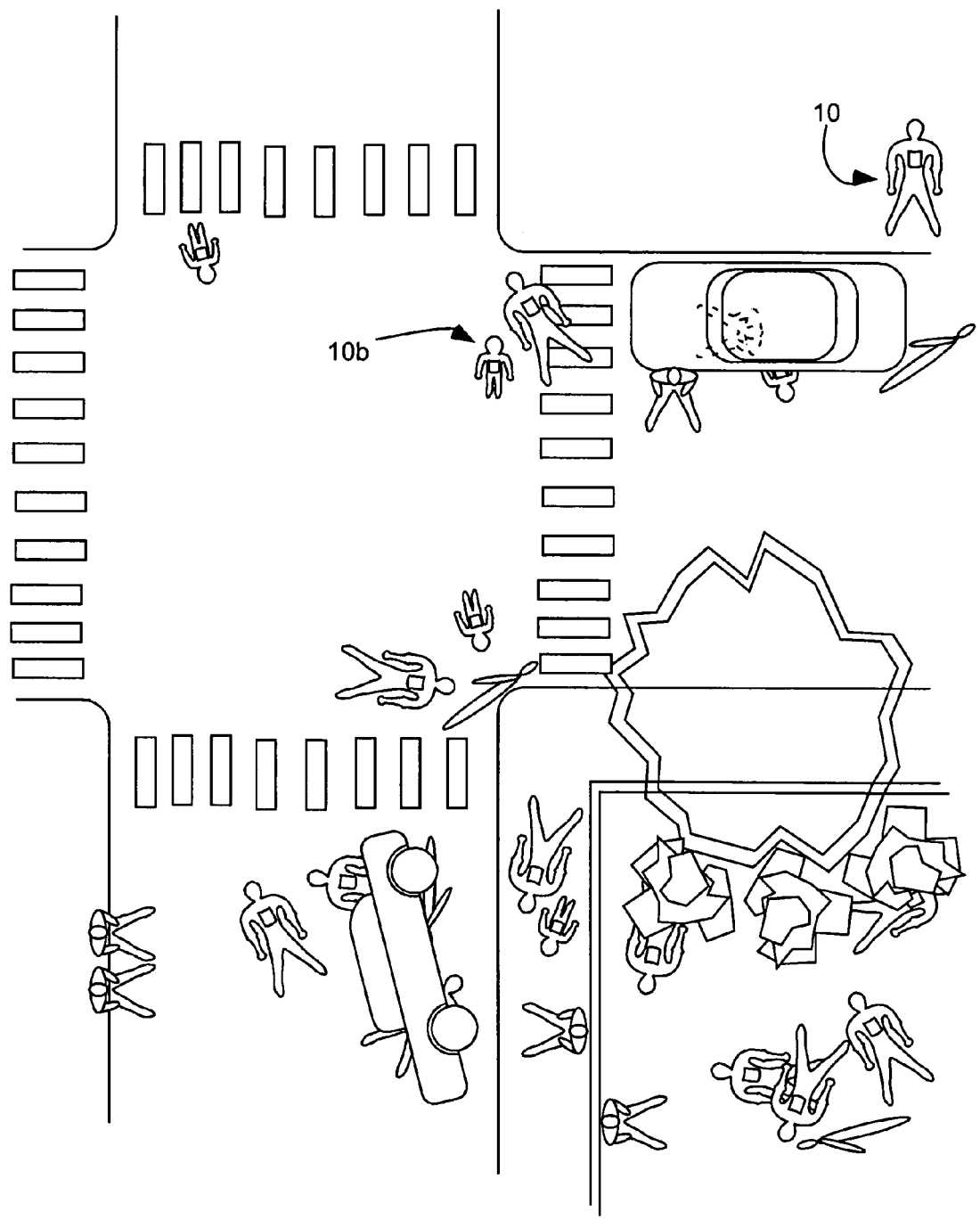
FIG. 6 is a top view of a mass casualty disaster training system and scenario in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIGS. 1-4, a mass casualty disaster training manikin (mannequin), indicated generally at 10, in accordance with the present invention is shown for use in training for mass casualty disasters. A plurality of such manikins 10 can be used, as described in greater detail below. The manikins 10 can be utilized to simulate a mass casualty disaster or scenario, including for example: terrorist attack; riot; transportation disaster, such as an airline, train, boat or car crash; natural disaster, such as earthquake, tornado, hurricane, flood, fire, avalanche or landslide; war or battle; etc. The manikins 10 can be arranged to simulate a plurality of victims of the mass casualty disaster scenario. The manikins can be used to train various different personnel and agencies, including for example, emergency medical technicians (EMTs), hospital staff, police, firefighters, transit employees, etc.

The manikins 10 can have a human form, or can be shaped and sized substantially as a human, to provide a degree of realism. Thus, the manikins can include a head, torso, legs and arms. The manikins can have different shapes or configurations. For example, some manikins can be provided without one or more appendages to be consistent with the predetermined medical conditions, such as amputation. In addition, the manikins can be configured with other human characteristics, such as clothing, facial features, etc. Such characteristics can be painted or printed on the manikins.

Furthermore, the manikins can be flexible or posable to provide realistic simulated configurations.

The manikins 10 can be collapsible and expandable so that they may be expanded for use and collapsed for storage, thus saving storage and transportation costs. It will be appreciated that a significant number of manikins can be utilized in a scenario with mass casualties, and that shipping and storage of numerous manikins can be costly. For example, the manikins 10 can be inflatable for use, and deflatable to reduce the storage volume of the manikins. The manikins 10 can include an inflatable bladder 14 that has a human form. The bladder 14 can be formed by opposing plies or sheets of material 18a and 18b joined together around a perimeter 22. For example, a pair of plies or sheets can be cut or stamped to have a desired human shape, and the perimeters can be welded or adhered together. The material can include vinyl or PVC that is sonic welded around the perimeter. An air inlet/outlet with a cap and/or valve 26 can extend through the bladder to allow the bladder to be filled with air. The valve 26 can be positioned at any appropriate location, and can include a plug received within an aperture, and a flexible flap pivotally disposed over the aperture as a check valve.

The inflatable bladder 14 also allows the manikin to be flexible or posable. The bladder 14 can be partially, or not quite fully inflated, to allow the bladder to be bent at certain locations, such as at the waist (FIG. 3), arms or legs. The bladder 14 can be configured or shaped to create bending points, such as at the waist, shoulders, elbows, knees and/or neck. The shape of the bladder can include lateral or perimeter projections and/or indentations in the sheets to create wrinkles in the sheets when inflated, and thus bending points.

The manikin or bladder can further include a ballast 30 to provide weight or anchoring to the manikin, and resist undesired displacement of the manikin, such as by wind. The ballast 30 can include one or more ballast compartments 34 formed with the inflatable bladder. The compartment 34 can be formed of another sheet of material, similar to the material of the bladder, coupled to the bladder to form the compartment. The ballast compartment 34 can be formed on or in the bladder. For example, the ballast compartments 34 can be formed at the foot location of the manikin or bladder. The compartment, however, can be disposed or located at any appropriate position. A ballast material 38 can be disposed in the compartments 34, and can have a weight greater than a weight of the inflatable bladder.

The ballast is an example of one means for maintaining a physical location of the manikin, or for resisting unintentional displacement of the manikin. Other means can also be used, including for example, staking the manikin to the ground or tying the manikin to another object. An aperture 42 can be formed on the manikin or bladder, such as in a tab of the sheet of material. A peg or a line 46 can be received through the aperture to stake or tie the manikin.

The manikins 10 also include indicia 50 indicative of predetermined physical or medical conditions associated with the mass casualty disaster. The indicia 50 can include text, or a readable text version of the physical or medical condition attributed to the respective manikin. The indicia 50 or text can include general background information of the victim, such as the victim's: age, weight, race, gender, etc. The indicia or text can include current medical conditions of the victim, such as the victim's: heart rate, blood pressure, body temperature, pain, consciousness, fractures, lacerations, burns, trauma, etc. The indicia or text can include information that might otherwise be observable in an actual disaster, such as exposure to nerve agent, exposure to biological agents, exposure to radiological material, condition of clothing, appearance of skin, etc. The indicia or text can also include information relating to the incident, such as: elapse time or time since incident, etc. Furthermore, the indicia can include graphics or pictures, such as of a particular wound or burn.

In accordance with one aspect of the invention, the indicia 50 or text can be provided on inserts 54. For example, the inserts 54 can be paper or cardstock with the indicia printed thereon. In addition, the inserts 54 can be laminated or otherwise protected. Thus, different disaster scenarios can be quickly and easily scripted or prepared, and the inserts printed for use. A plurality of inserts can be provided, and the inserts can be different, or can include several different medical conditions. The inserts can be provided in sets representing a particular scenario. In addition, the inserts or indicia can have different levels of severity. Thus, during training, the medical personnel will be presented with multiple different symptoms.

A pocket 58 can be formed on the inflatable bladder 14 or manikin 10 to receive the insert 54. Thus, the insets 54 can be removably disposed in the pockets 58. Removable inserts 54 allow the conditions or scenarios to be quickly and easily changed. In addition, it allows the manikins to be disposed in a scenario, and the inserts to be inserted afterwards so that specific manikins do not need to be positioned in specific locations. The pocket 58 can be a clear plastic sheet adhered or welded to one of the sheets of the bladder. For example, a clear plastic sheet can be sonic welded around three sides (bottom and sides) to a top sheet 18a of the bladder 14 to form the pocket. Thus, the indicia or text can be visible through the pocket. The pocket can be located on the chest or torso of the manikin, as shown. It is of course understood that several different pockets can be provided on a single manikin, and that the pocket(s) can be located at different locations, thus causing the medical personnel to inspect the manikins as they would a real victim.

Figure 7:
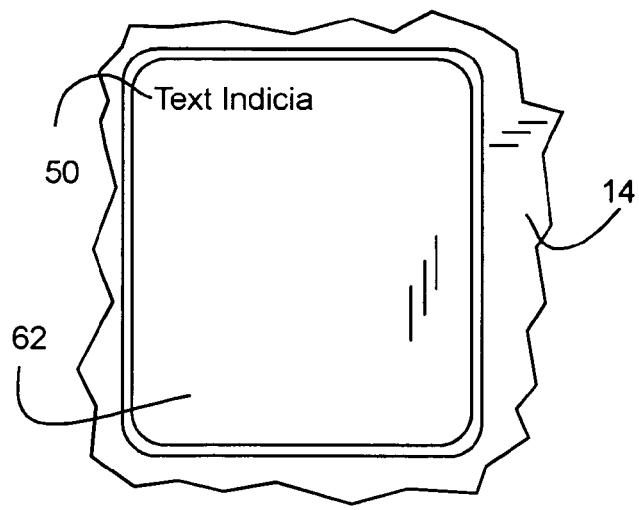
FIG. 7 is a partial front view of another mass casualty disaster manikin in accordance with an embodiment of the present invention.
Figure 8:
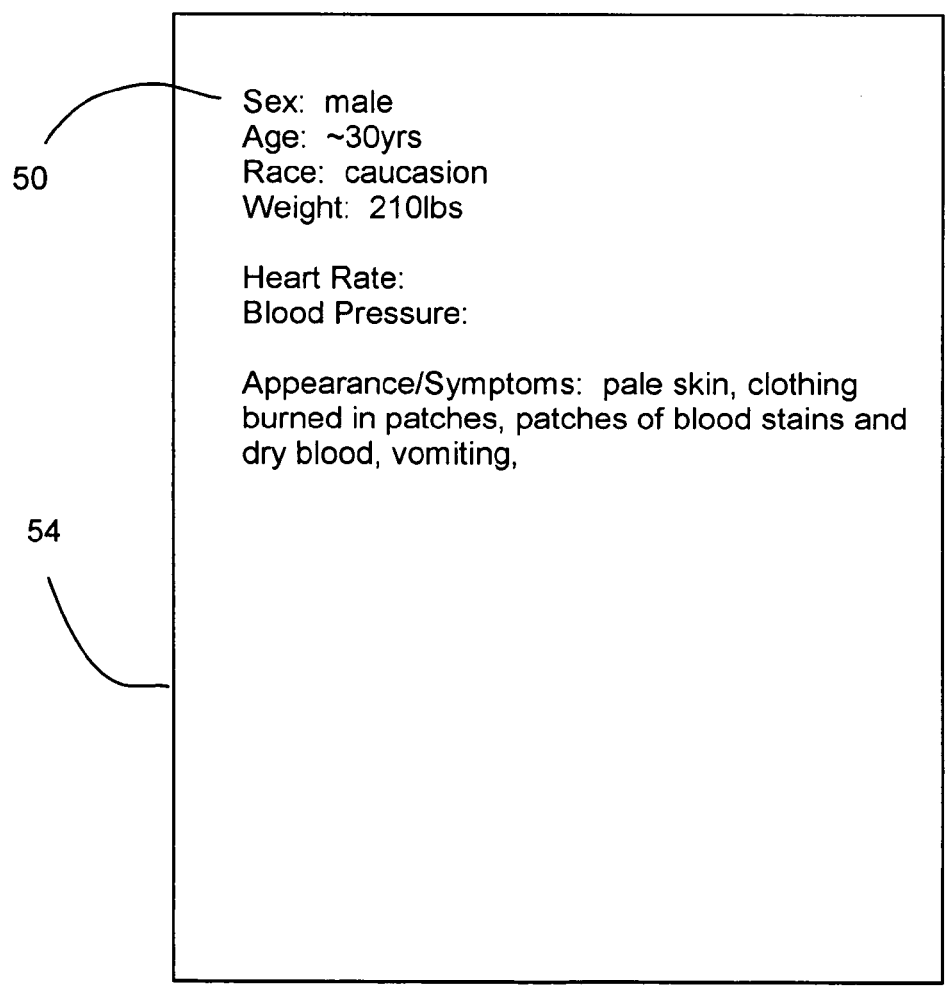
FIG. 8 is a front view of an insert with text indicia of the manikin of FIG. 1.

In another aspect, the pocket can include a frame with an opening therein through which the insert can be viewed. In another aspect, a panel 62 (FIG. 7) can be formed on a torso region of the manikin, with the indicia disposed on the panel. The text or indicia can be permanently formed on the panel, such as by printing. In another aspect, the panel can provide an erasable surface, such as a dry-erase surface, and the indicia or text can be eraseably written on the panel. In another aspect, the panels can be removably secured to the bladder or manikin, such as with snaps or hook-and-loop type fasteners.

The manikins 10 can be provided in different sizes. For example, many manikins 10 can have a size corresponding to an adult, or approximately 5.5-6.5 feet in length or height. Other manikins 10b (FIG. 5) can have a size corresponding to a child, or approximately 2-3 feet in length or height. The different sizes help define a more realistic scenario.

A plurality of the mass casualty disaster training manikins 10 described above can be provided as a mass casualty disaster training system. As described above, a plurality of manikins can be provided with a plurality of different inserts, or sets of inserts.

The manikins 10 can be used to instruct emergency personnel on various aspects of emergency response, particularly in a mass casualty disaster situation. The instruction can include for example, proper procedures, panic control, crowd control, triage, resisting self-contamination, inter-department communication, etc. In addition, the instruction can include practicing emergency procedures using the manikins, such as transport, triage, etc.

A method for training for mass casualty disasters includes arranging a plurality of manikins 10 to simulate a plurality of victims of a mass casualty disaster, such as shown in FIG. 4. The type and scope of the disaster scenario can be determined beforehand, and the manikins 10 arranged and posed consistent with a predetermined scenario. Emergency personnel can then simulate triage and treatment of the plurality of manikins. In addition, the simulation can include instruction, such as how to triage mass casualties, how to communicate between various different agencies, etc. The simulation can include transporting the manikins, as victims.

Prior to the simulation, the plurality of inflatable manikins can be inflated. An air compressor or blower can be used to facilitate inflation. It will be appreciated that inflating a plurality of manikins can be easier than arranging for, and coordinating, a plurality of actual human actors. After the simulation, the manikins can be deflated and stored. Deflating the manikins reduces the storage volume and handling of the manikins.

In addition, the physical location of the plurality of manikins can be maintained due to the ballast, and/or being staked or tied.

In addition, prior to the simulation, a disaster scenario can be prepared or scripted. The number and type of victims, as well as the type and severity of injuries, can be determined. This information can be prearranged as the indicia on the manikins. For example, a plurality of different inserts can be printed. The inserts can then be inserted into the pockets. The manikins can be positioned first, and the inserts inserted second. Thus, all the manikins can be distributed generically, and the inserts can be inserted in appropriate locations.

Emergency personnel can be instructed on aspects of responding to the disaster scenario, before, after, and/or during the simulation.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A mass casualty disaster training system, comprising:
   a) a plurality of manikins arrangeable to simulate a plurality of victims of a mass casualty disaster, each of the plurality of manikins comprising:
      i) an inflatable bladder with a human form;
      ii) an aperture extending through the inflatable bladder from one side to another side; and
      iii) a peg or a line, receivable through the aperture; and
   b) a plurality of indicia, each disposed on each of the plurality of manikins, indicative of predetermined physical or medical conditions associated with the mass casualty disaster.

2. A system in accordance with claim 1, wherein each of the plurality of manikins is expandable and collapsible.

3. A system in accordance with claim 1, wherein each of the plurality of manikins further comprises:
   means, coupled to the inflatable bladder, for maintaining a physical location of the manikin.

4. A system in accordance with claim 1, wherein each of the plurality of manikins further comprises:
   a ballast, attached to the inflatable bladder.

5. A system in accordance with claim 4, wherein the ballast further comprises:
   a ballast compartment, formed with the inflatable bladder; and
   a ballast material, disposed in the compartment, having a weight greater than a weight of the inflatable bladder.

6. A system in accordance with claim 1, wherein each of the plurality of manikins further comprises:
   a pocket, formed on the inflatable bladder; and
   an insert, receivable within the pocket, with the indicia disposed on the insert and visible from the pocket.

7. A system in accordance with claim 1, wherein each of the plurality of manikins further comprises:
   a panel, formed on a torso region of the manikin, with the indicia disposed on the panel.

8. A system in accordance with claim 1, wherein the indicia includes text.

9. A system in accordance with claim 8, wherein the text is selected from the group consisting of: age, weight, race, gender, heart rate, blood pressure, body temperature, elapse time or time since incident, pain, consciousness, fractures, lacerations, burns, trauma, exposure to nerve agent, exposure to biological agents, and exposure to radiological material.

10. A system in accordance with claim 1, wherein the plurality of manikins have at least two different sizes.

11. A system in accordance with claim 1, wherein each of the plurality of indicia further comprises:
    a clear sheet attached to a manikin to form a pocket; and
    a removable insert removably disposable in the pocket with the indicia thereon and visible through the clear sheet.

12. A system in accordance with claim 11, wherein the clear sheet is attached directly to the manikin.

13. A system in accordance with claim 11, wherein the clear sheet is attached to a torso of the manikin.

14. A mass casualty disaster training system, comprising:
    a) a plurality of inflatable manikins arrangeable to simulate a plurality of victims of a mass casualty disaster, having human form and inflatable bladders;
    b) a plurality of pockets, each formed on one of the inflatable bladders of each of the plurality of inflatable manikins; and
    c) a plurality of inserts, each receivable within one of the pockets, with text indicia disposed on the inserts, the text indicia indicative of predetermined physical or medical conditions associated with the mass casualty disaster.

15. A system in accordance with claim 14, wherein each of the plurality of manikins further comprises:
    means, coupled to the inflatable bladder, for maintaining a physical location of the manikin.

16. A system in accordance with claim 14, wherein each of the plurality of manikins further comprises:
    a ballast, attached to the inflatable bladder.

17. A system in accordance with claim 16, wherein the ballast further comprises:
    a ballast compartment, formed with the inflatable bladder; and
    a ballast material, disposed in the compartment, having a weight greater than a weight of the inflatable bladder.

18. A system in accordance with claim 14, wherein each of the plurality of manikins further comprises:
    an aperture, extending through the inflatable bladder from one side to another side; and
    a peg or a line, receivable through the aperture.

19. A system in accordance with claim 14, wherein the text indicia is selected from the group consisting of: age, weight, race, gender, heart rate, blood pressure, body temperature, elapse time or time since incident, pain, consciousness, fractures, lacerations, burns, trauma, exposure to nerve agent, exposure to biological agents, and exposure to radiological material.

20. A system in accordance with claim 14, wherein the plurality of manikins have at least two different sizes.

21. A system in accordance with claim 14, wherein each pocket is formed by a clear sheet attached to an inflatable manikin; and wherein each insert is disposable in a pocket and the indicia is visible through the clear sheet.

22. A system in accordance with claim 21, wherein the clear sheet is attached directly to the inflatable bladder.

23. A system in accordance with claim 21, wherein the pocket is disposed on a torso of the manikin.

24. A mass casualty disaster training manikin device configured to simulate a victim of a mass casualty disaster scenario, the device comprising:
   a) an inflatable bladder with a human form arrangeable to simulate a victim of a mass casualty disaster;
   b) a clear sheet attached to the inflatable bladder to form a pocket; and
   c) a removable insert, receivable within the pocket, with indicia indicative of predetermined physical or medical conditions associated with the mass casualty disaster disposed on the insert and visible through the clear sheet; and
   d) means, coupled to the inflatable bladder, for maintaining a physical location of the bladder.

25. A device in accordance with claim 24, wherein the means for maintaining further comprises:
   a ballast, attached to the inflatable bladder.

26. A device in accordance with claim 25, wherein the ballast further comprises:
   a ballast compartment, formed with the inflatable bladder; and
   a ballast material, disposed in the compartment, having a weight greater than a weight of the inflatable bladder.

27. A device in accordance with claim 24, wherein the means for maintaining further comprises:
   an aperture, associated with the inflatable bladder; and
   a peg or a line, receivable through the aperture.

28. A device in accordance with claim 24, further comprising:
   a panel, formed on a torso region of the manikin, with the indicia disposed on the panel.

29. A system in accordance with claim 24, wherein the indicia includes text.

30. A device in accordance with claim 29, wherein the text indicia is selected from the group consisting of: age, weight, race, gender, heart rate, blood pressure, body temperature, elapse time or time since incident, pain, consciousness, fractures, lacerations, burns, trauma, exposure to nerve agent, exposure to biological agents, and exposure to radiological material.

31. A system in accordance with claim 24, wherein the clear sheet is attached directly to the inflatable bladder.

32. A system in accordance with claim 24, wherein the clear sheet is attached to a torso of the manikin.

33. A mass casualty disaster training manikin device configured to simulate a victim of a mass casualty disaster, the device comprising:
   a) an inflatable bladder with a human form arrangeable to simulate a victim of a mass casualty disaster;
   b) a pocket, formed on the inflatable bladder;
   c) an insert, receivable within the pocket;
   d) text indicia, disposed on the insert, indicative of a predetermined physical or medical condition associated with the mass casualty disaster; and
   e) means, coupled to the inflatable bladder, for maintaining a physical location of the bladder.

34. A device in accordance with claim 33, wherein the means for maintaining further comprises:
   a ballast, attached to the inflatable bladder.

35. A device in accordance with claim 34, wherein the ballast further comprises:
   a ballast compartment, formed with the inflatable bladder; and
   a ballast material, disposed in the compartment, having a weight greater than a weight of the inflatable bladder.

36. A device in accordance with claim 33, wherein the means for maintaining further comprises:
   an aperture, extending through the inflatable bladder from one side to another side; and
   a peg or a line, receivable through the aperture.

37. A device in accordance with claim 33, wherein the text indicia is selected from the group consisting of: age, weight, race, gender, heart rate, blood pressure, body temperature, elapse time or time since incident, pain, consciousness, fractures, lacerations, burns, trauma, exposure to nerve agent, exposure to biological agents, and exposure to radiological material.

38. A system in accordance with claim 33, wherein each pocket is formed by a clear sheet attached to the inflatable bladder; and wherein each insert is visible through the clear sheet.

39. A system in accordance with claim 38, wherein the clear sheet is attached directly to the inflatable bladder.

40. A system in accordance with claim 38, wherein the pocket is disposed on a torso of the manikin.

* * * * *